(12) United States Patent
Schiefelbein et al.

(10) Patent No.: US 10,001,981 B2
(45) Date of Patent: Jun. 19, 2018

(54) AUTONOMOUS SERVER INSTALLATION

(71) Applicant: AT&T INTELLECTUAL PROPERTY I, LP, Atlanta, GA (US)

(72) Inventors: Andrew Schiefelbein, St. Louis, MO (US); Gregory Paul, Edmonds, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 5 days.

(21) Appl. No.: 15/165,680

(22) Filed: May 26, 2016

(65) Prior Publication Data

US 2017/0344354 A1  Nov. 30, 2017

(51) Int. Cl.
*G06F 9/445* (2018.01)

(52) U.S. Cl.
CPC ..................... *G06F 8/61* (2013.01)

(58) Field of Classification Search
None
See application file for complete search history.

(56) References Cited

U.S. PATENT DOCUMENTS

| | | | |
|---|---|---|---|
| 6,035,420 A | 3/2000 | Liu et al. |
| 6,681,323 B1 | 1/2004 | Fontanesi et al. |
| 6,704,864 B1 | 3/2004 | Philyaw et al. |
| 6,725,261 B1 | 4/2004 | Novaes et al. |
| 6,807,557 B1 | 10/2004 | Novaes et al. |
| 7,185,076 B1 | 2/2007 | Novaes et al. |
| 7,240,107 B2 | 7/2007 | Chase-Salerno et al. |
| 7,290,258 B2 | 10/2007 | Steeb et al. |
| 7,395,324 B1 | 7/2008 | Murphy et al. |
| 7,421,688 B1 | 9/2008 | Righi et al. |
| 7,937,455 B2 | 5/2011 | Saha et al. |
| 8,176,138 B1 | 5/2012 | Abdelaziz et al. |
| 8,615,566 B1 * | 12/2013 | Tu ................. G06F 11/2025 709/219 |

(Continued)

FOREIGN PATENT DOCUMENTS

AU   2012375273 A1   9/2014
CA   2645716 A1   5/2009

(Continued)

OTHER PUBLICATIONS

"OpenStack", www.openstack.org, May 26, 2016.

(Continued)

*Primary Examiner* — Daxin Wu
(74) *Attorney, Agent, or Firm* — Guntin & Gust, PLC; Joseph Hrutka (57) ABSTRACT

Aspects of the subject disclosure may include, for example, a system for preparing servers for service over a network, where the servers include out of band management cards. The system may include a processor, a database of server configuration information, and a memory that stores executable instructions that, when executed by the processor, facilitate performance of operations. The operations can include establishing a secure hypertext transport protocol session over the network with the out of band management card for the server to mount and execute a preinstall image that performs an installation, without any specific network configuration, and where the installation is performed without deploying an agent. Other embodiments are disclosed.

20 Claims, 5 Drawing Sheets

(56) References Cited

U.S. PATENT DOCUMENTS

| | | | |
|---|---|---|---|
| 8,782,098 B2 | 7/2014 | Prabu et al. | |
| 8,935,216 B2 | 1/2015 | Miller et al. | |
| 9,047,132 B2 | 6/2015 | Haenel et al. | |
| 9,191,275 B1* | 11/2015 | Worsley | H04L 41/0803 |
| 9,239,725 B2 | 1/2016 | Qu | |
| 9,262,257 B2 | 2/2016 | Allu et al. | |
| 2003/0097422 A1 | 5/2003 | Richards et al. | |
| 2007/0089093 A1* | 4/2007 | Simkins | G06F 11/3688 717/126 |
| 2008/0098094 A1* | 4/2008 | Finkelstein | G06F 9/4411 709/220 |
| 2008/0255813 A1* | 10/2008 | Fine | G06F 17/504 703/2 |
| 2010/0325410 A1* | 12/2010 | Fitzgerald | G06F 8/63 713/2 |
| 2012/0110148 A1* | 5/2012 | Liu | H04L 29/12066 709/220 |
| 2012/0209981 A1* | 8/2012 | Bolan | G05B 23/0267 709/223 |
| 2013/0067209 A1* | 3/2013 | Hall | G06F 9/441 713/2 |
| 2013/0232094 A1* | 9/2013 | Anderson | G05B 23/0229 706/12 |
| 2014/0096128 A1* | 4/2014 | Pohlmann | G06F 8/61 717/176 |
| 2015/0113263 A1 | 4/2015 | Wu | |
| 2015/0163294 A1 | 6/2015 | Peterson | |
| 2015/0271014 A1 | 9/2015 | Alexander | |
| 2016/0283311 A1* | 9/2016 | Joshi | G06F 11/0766 |
| 2017/0046181 A1* | 2/2017 | Williams | G06F 9/44526 |
| 2017/0123927 A1* | 5/2017 | Su | G06F 11/1417 |

FOREIGN PATENT DOCUMENTS

| | | |
|---|---|---|
| CA | 2880732 A1 | 2/2014 |
| FR | 2931970 A1 | 12/2009 |
| JP | 2001092641 A | 4/2001 |
| WO | 0116701 A2 | 3/2001 |
| WO | 0225436 A3 | 8/2002 |
| WO | 02073438 A1 | 9/2002 |
| WO | 03052596 A1 | 6/2003 |

OTHER PUBLICATIONS

Anderson, Paul et al., "Experiences and Challenges of Large-Scale System Configuration", GridWeaver Project, 2003.

Anderson, Paul et al., "Technologies for large-scale configuration management", Technical re port, The GridWeaver Project, 2002.

Beckett, G. et al., "GridWeaver: automatic, adaptive, large-scale fabric configuration for Grid Computing", 2003.

Kinzhalin, Arzhan et al., "Enabling the autonomic data center with a smart bare-metal server platform", Proceedings of the 6th international conference on Autonomic computing. ACM, 2009.

Schmelzer, Sebastian , "Universal remote boot and administration service", Network Operations and Management Symposium (LANOMS), 2011 7th Latin American. IEEE, 2011.

* cited by examiner

FIG. 5

AUTONOMOUS SERVER INSTALLATION

FIELD OF THE DISCLOSURE

The subject disclosure relates to an automated system and method for performing an autonomous server installation.

BACKGROUND

Building large complex server farms including several rows of rack mounted servers has largely been a manual process. This manual process includes physically installing each server's hardware into a rack. After rack mounting the server, network wiring cables are connected to the server.

The manual process continues by updating a management interface for the server and the server's Basic Input/Output System (BIOS). At this point, the server may not have an Operating System (OS), from which the server can be started up, or "booted." For small installations consisting of a few servers, the server is generally booted from an OS found on server installation media that is manually inserted into the server. Alternatively, administrators may take advantage of booting a server into a Preboot Execution Environment (PXE). PXE booting allows the server to be configured and booted remotely by an administrator from media stored elsewhere on the network, but requires a PXE-capable network interface card, and a trivial file transfer protocol server on the network to provide an initial boot image, which would be generic for all PXE booted servers. Beyond this initial image boot, there would be several manual steps involved to get a server configured to a fully operating configuration.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for automatically configuring a server for operation. Other embodiments are described in the subject disclosure.

One or more aspects of the subject disclosure include autonomously configuring an out of band management card for the server across a network, using a high level network communication protocol, in particular, secure hypertext transport protocol (HTTPS). In one embodiment, such configuration would not require human interaction with the server, or human presence at the server. In another embodiment, the out of band management card can be configured without preinstalling any software on the server, such as an agent.

One or more aspects of the subject disclosure also includes autonomously configuring the BIOS of the server across a network. The BIOS configuration can be detected using HTTPS queries sent to the out of band management card from any machine whose data packets can be routed to the server through the Internet. Such BIOS configuration settings can also be changed using HTTPS commands sent to the out of band management card of the server. In addition, the BIOS version can be updated (e.g., flashed) using HTTPS commands sent to the out of band management card of the server. Such BIOS reconfiguration can be accomplished without human interaction with the server, or human presence at the server, and without preinstalling any software on the server, such as an agent.

One or more aspects of the subject disclosure also includes sending a command using the HTTPS protocol to automatically boot the server from an initial operating system mounted across the network from any machine whose data packets can be routed to the server through the Internet. The initial OS boot image is downloaded into the server without human interaction with the server, or human presence at the server, and without preinstalling any software on the server, such as an agent.

One or more aspects of the subject disclosure further includes automatically configuring server system settings, installing a base operating system, preparing media, adding users and groups, and installing software applications.

One or more aspects of the subject disclosure further includes configuring server system settings, installing a base operating system, preparing network interfaces and storage media, adding users and groups, and installing software applications such that the server will be fully operational.

One or more aspects of the subject disclosure further includes automatically performing an inventory of server hardware, firmware and software, automatically performing server inventory and operational testing, and generating results once the server installation has completed.

One or more aspects of the subject disclosure further includes a system for preparing servers for service over a network, the servers comprising out of band management cards, the system comprising: a processor; a database comprising server configuration information; and a memory that stores executable instructions that, when executed by the processor, facilitate performance of operations, comprising: deriving a hostname from an out of band management card in a server on the network; reading a configuration for the server from the database based on the hostname; building a custom preinstall image from the configuration; establishing a HTTPS session over the network with the out of band management card that causes the server to load and execute the custom preinstall image for an installation, wherein the session is established without any specific network configuration, wherein the session is established without any software installed on the server, and wherein the installation is performed without deploying an agent; and receiving an indication from the server that the installation has completed.

In yet another aspect of the subject disclosure, the server configuration information comprises a BIOS version, a base operating system, device configuration, kernel configuration, location configuration, users, groups, software packages, or a combination thereof. In yet another aspect of the subject disclosure, the operations further comprise receiving a catalog of hardware installed in the server. In yet another aspect of the subject disclosure, the operations further comprise comparing the catalog of the hardware with a hardware inventory; and determining whether the server has malfunctioning hardware, misconfigured hardware, missing hardware, additional hardware, or a combination thereof based on the comparison.

In yet another aspect of the subject disclosure, the operations further comprise sending a HTTPS BIOS detection instruction over the network to the out of band management card and receiving current BIOS configuration of the server. In yet another aspect of the subject disclosure, the operations further comprise comparing the current BIOS configuration of the server with the server configuration information; and determining whether the server has a misconfigured BIOS based on the comparison. In yet another aspect of the subject disclosure, the operation further comprise sending a HTTPS BIOS instruction over the network to the out of band management card to update BIOS settings of the server and resetting the server.

In yet another aspect of the subject disclosure, the operations further comprise receiving a catalog of software packages installed in the server. In yet another aspect of the subject disclosure, the operations further comprise comparing the catalog of the software packages with a software inventory; and determining whether the server has missing software packages, additional software packages, or a combination thereof based on the comparison.

In yet another aspect of the subject disclosure, the operations further comprise sending a HTTPS shutdown instruction over the network to the out of band management card to turn off power to the server; and sending a HTTPS power instruction over the network to the out of band management card to turn on power to the server. In yet another aspect of the subject disclosure, the operations further comprise sending a HTTPS management instruction over the network to the out of band management card to configure the out of band management card.

One or more aspects of the subject disclosure further includes a machine-readable storage medium, comprising executable instructions that, when executed by a processor, facilitate performance of operations, comprising: reading a configuration for a server from plurality of server configurations stored in a database; selecting one or more tests for the server; building a custom preinstall image from the configuration; sending a HTTPS preinstall instruction over a network to an out of band management card to mount and execute the custom preinstall image, wherein the custom preinstall image causes the server to perform an installation and the one or more tests, wherein instruction is sent without any specific network configuration, and wherein the installation is performed without deploying an agent; receiving an indication and test results from the server, wherein the indication indicates that the installation has completed; analyzing the test results to ensure that the server has passed the one or more tests; and placing the server into operational service, responsive to the analysis.

In yet another aspect of the subject disclosure, selecting the tests comprises making the selection according to heuristic troubleshooting rules. In yet another aspect of the subject disclosure, the tests are selected based on mean time to failure for one or more components of the server. In yet another aspect of the subject disclosure, the selected tests are stress tests for the one or more components of the server. In yet another aspect of the subject disclosure, the tests are selected based on mean time to recovery for one or more components of the server. In yet another aspect of the subject disclosure, the tests are selected based on a linear regression analysis for one or more components of the server. In yet another aspect of the subject disclosure, the selected tests are periodically scheduled performance tests for the one or more components of the server.

One or more aspects of the subject disclosure further includes a method of deploying virtual servers in a network, comprising: identifying, by a system comprising a processor, a hostname for a server from an out of band management card in the server on the network; determining a virtualization class for the server based on the hostname; building a base operating system customized to unique parameters of the virtualization class; and sending a HTTPS preinstall instruction over the network to the out of band management card to mount and execute a preinstall image by the server that causes the server to perform an installation comprising the base operating system, wherein installation causes the server to automatically instantiate a specific set of virtual machines, wherein instruction is sent without any specific network configuration, and wherein the installation is performed without deploying an agent.

In yet another aspect of the subject disclosure, the virtualization class comprises one of a controller node, a compute node, or a network node, and wherein the installation causes the server to associate with other servers having a same virtualization class in the network.

Figure 1:
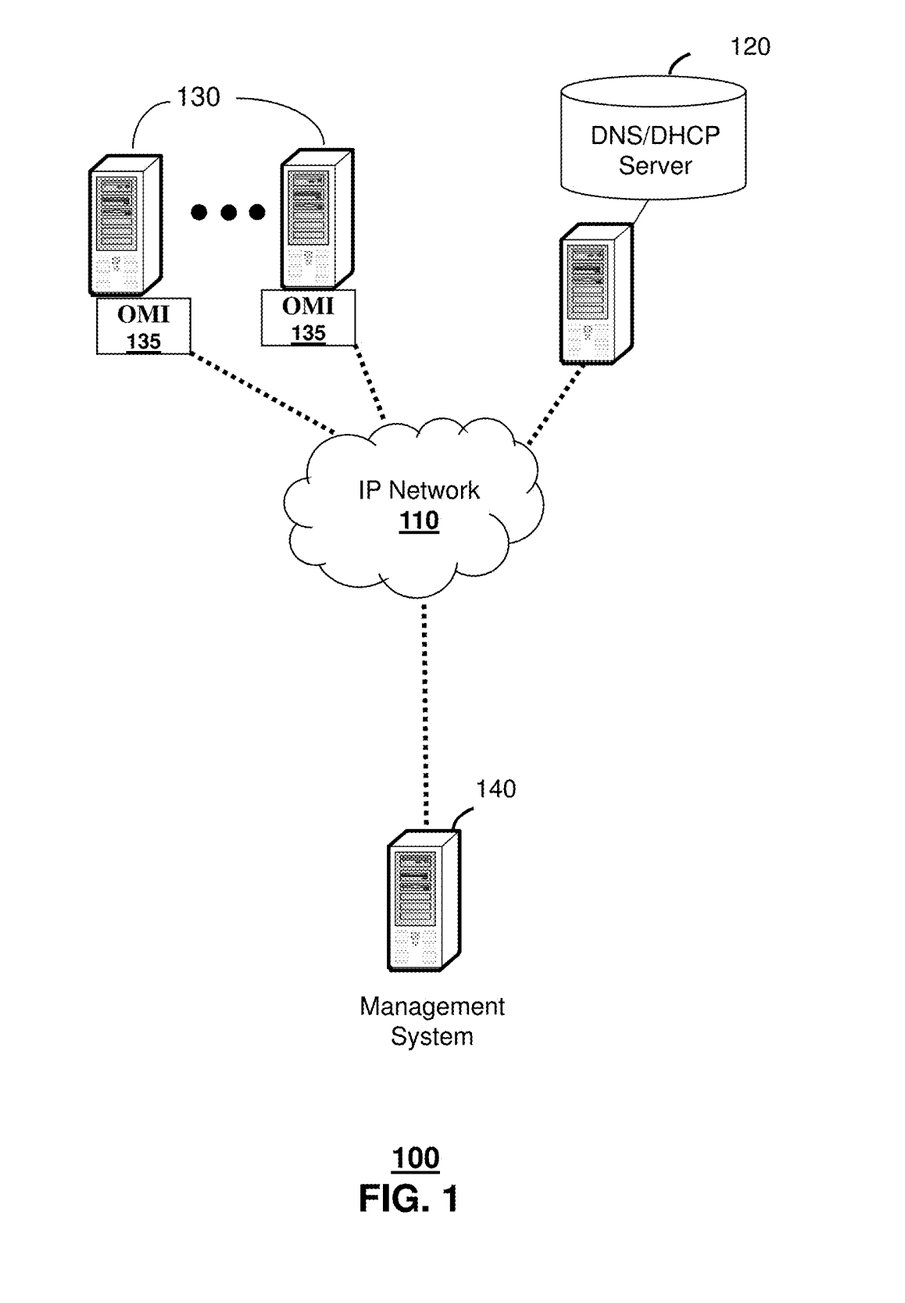
FIG. 1 is a block diagram depicting an illustrative embodiment of a fully autonomous network server installation system.

FIG. 1 depicts an illustrative embodiment of an autonomous network server installation system, which in one or more embodiments can be fully autonomous. As shown in FIG. 1, system 100 comprises a communication network 110 (e.g., an Internet Protocol (IP) network), a domain name system (DNS) and dynamic host configuration protocol (DHCP) server 120, a plurality of system servers 130, and a management system 140. IP network 110 can include a plurality of routers and interconnected communication paths (not illustrated) responsible for routing and delivery of IP data packets between computers attached to the IP network. IP network 110 can include various other network elements that enable or otherwise provide communication services. IP network 110 may be a local area network, a metropolitan area network, a wide area network, and/or the Internet.

DNS/DHCP server 120 is illustrated as a single server, but may comprise a plurality of servers performing both DNS and DCHP functions, or may comprise separate servers performing one or both functions. The DNS function of the DNS/DHCP server 120 is responsible for maintaining a hierarchical decentralized naming system for computers, services, and/or any resource connected to IP network 110, such as is known in the art. DNS can associate various information with domain names assigned to each of the participating entities. In particular, the DNS/DHCP server 120 can provide each server 130 on IP network 110 with its hostname.

The DHCP function of the DNS/DHCP server 120 utilizes a client/server protocol that automatically provides an IP host with its IP address and other related configuration information, such as the subnet mask and default gateway, such as is known in the art. DNS/DHCP server 120 provides this information to a DHCP client through the exchange of a series of messages, known as the DHCP conversation or the DHCP transaction. If the DNS/DHCP server and DHCP clients are located on different subnets, a DHCP relay agent can be used to facilitate the conversation. In particular, the DNS/DHCP server 120 can provide each server 130 on IP network 110 with its IP address.

System servers 130 can be physical servers (also known as "bare metal" servers), such as installed in a rack (although not a requirement), having network interfaces connected to the IP network 110. Servers 130 can be connected to a power source and can have a full complement of hardware installed therein. In one or more embodiments, the servers 130 lack installation of any operating software. Servers 130 are not limited to a single homogenous set of machines. In one embodiment, servers 130 may be any commodity hardware and that set of machines can become a working cluster of systems, each with a specific task setup, regardless of network topology.

In one embodiment, included in each server 130 is an out-of-band management interface (OMI) 135. In another embodiment, OMI 135 can be a lights out management technology offered by hardware vendors, such as an Integrated Lights-Out (ILO) embedded server management interface (e.g., an ILO interface provided by Hewlett-Packard, but may also be offered by other vendors, for example Sun/Oracle's ILOM, Dell DRAC, the IBM Remote Supervisor Adapter and Cisco CIMC). OMI 135 can be connected to IP network 110, provided with power, and fully operational, even if server 130 has not yet been powered on. OMI 135 can provide the ability to physically power up the server 130, reset the server 130, update the BIOS of server 130, mount media on the server 130 and/or boot the server 130 from an initial operating system image downloaded over IP network 110, among others, as explained more fully below. OMI 135 can acquire an IP address and a hostname from the DNS/DHCP server 120 and, through its connection to IP network 110, can provide a representational state transfer application programming interface (RESTful API) that a machine can establish a connection with using the HTTPS protocol.

It should be noted that while system servers 130 are described as "physical," there is no limitation preventing virtualization server implementations. For example, OpenStack (https://www.openstack.org/) is a current defacto standard for open sourced cloud computing. OpenStack requires the following three groups of separate machines: (1) Controller node(s) (master database and main user interface) (2) Network node(s) used to do software defined networking and (3) Compute node(s) used as the hypervisor for virtual machines and virtualized containers, e.g., OS level virtualizations, to automatically flow out based on specific plans or ad hoc conditions. The system and methods described below can also be implemented on such hardware to provide virtual servers under the OpenStack paradigm by installing a base OS customized to the unique parameters each specific virtualization class of system (controller, compute, network, etc.), automatically configure the software copied on to each of these groups of machines based on a customizable set for the environment, and federate them so the machines will perform the required functions thereafter, and automatically instantiate a specific set of virtual machines/docker containers to handle any specific set of work that would be needed by the environment. As yet a further example, with virtualization of OMI 135 contained within each server 130, entire virtual server farms could be implemented on a single, powerful server system. Other virtualization server implementations can also be utilized by the exemplary embodiments which may or may not be based on OpenStack.

In one embodiment, management system 140 comprises a fully operational server connected to IP network 110. Management system 140 can include a file system and a multitasking operating system, such as known in the art. In one embodiment, management system 140 comprises a Linux operating system and a Linux native file system. Management system 140 can be responsible for controlling the operation of one, some or all of the servers 130 through IP network 110 to install, configure and/or test the servers 130 to ensure that servers 130 are made fully ready for their intended server functions. Aspects of management system 140 are set forth more fully below.

Figure 2:
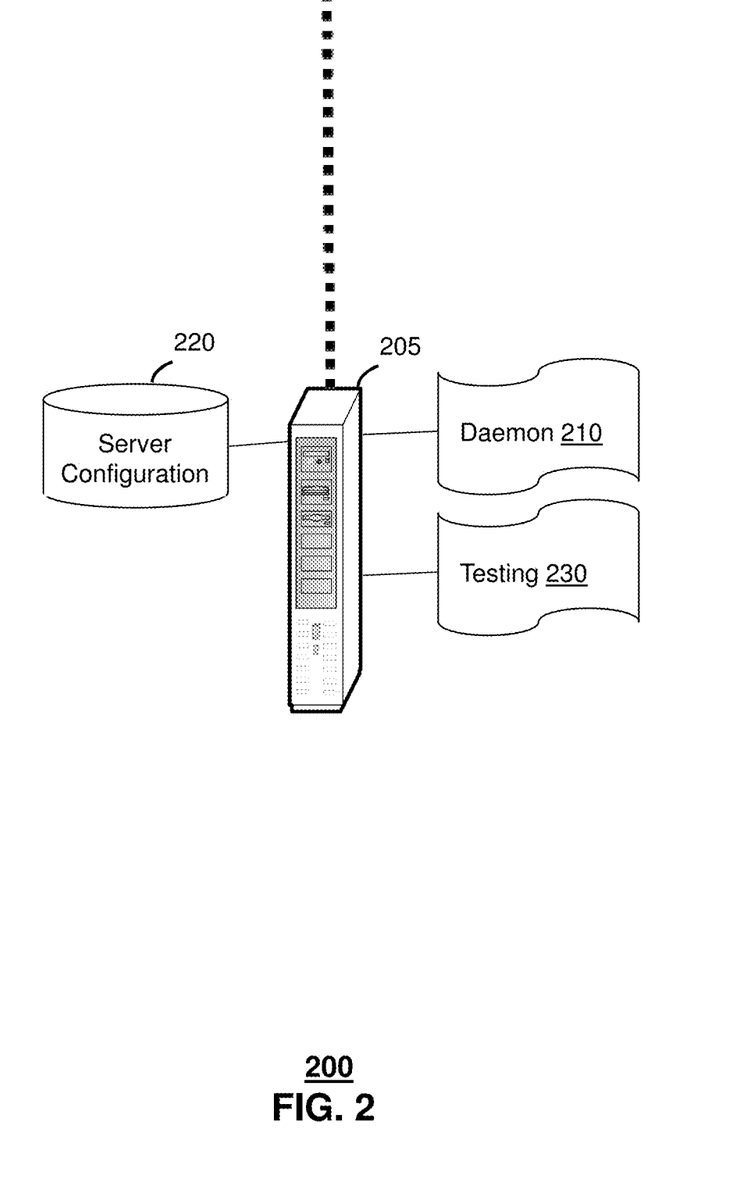
FIG. 2 depicts an illustrative embodiment of a management system of an autonomous network server installation system.

FIG. 2 depicts an illustrative embodiment of a management system 200. As shown in FIG. 2, management system 200 comprises a computer 205, an initializing daemon 210, a server configuration database 220, and testing software 230.

In one embodiment of multitasking computer operating systems, a daemon can be a computer program that runs as a background process, rather than being under the direct control of an interactive user. Initializing daemon 210 is one such background process on management system 200, and can be stopped, started, and restarted, as is well-known in the art. Initializing daemon 210 may be started and/or stopped from a console on management system 200. Initializing daemon 210 can be responsible for automatically performing a series of tasks, including reading in a preconfigured set of server names from server configuration database 220. Initializing daemon 210 then can wait for an OMI 135 of a server 130 to become visibly present on IP network 110. Once the OMI 135 for the server 130 is visible on the IP network 110, initializing daemon 210 can perform a series of tasks to install, configure and/or test the servers 130, such as described in connection with FIG. 3 below. In one embodiment, the initializing daemon 210 can be a multitasking daemon, such that many of the servers 130 can be identified, installed, configured and/or tested concurrently.

In one embodiment, server configuration database 220 comprises one or more preinstall images, such as stored as binary images of an optical media file system (e.g., bearing an .iso file extension). In one embodiment, server configuration database 220 can be implemented as a hierarchical Linux file system comprising subdirectories corresponding to the hostname of the server 130. Server configuration database 220 can also include hardware and/or BIOS configuration settings for each server 130. Server configuration database 220 may also comprise a generic OS for a group of servers, and/or a custom OS for particular servers among servers 130. Server configuration database 220 may also comprise one or more of server system settings, network interface card settings, media partitioning and initialization, localization settings, users and group settings. Server configuration database 220 may also comprise copies of the kernel and binaries and/or software applications for installation on the server and/or instructions for downloading software applications for installation on the server from the Internet. In one embodiment, server configuration database 220 includes a RedHat kickstart file that is downloaded and run by the server 130 during the installation process. In another embodiment, server configuration database 220 includes virtual machine templates, Windows scripthost answer files, switch or router configuration files, etc., for building any host or server or supplying server functions or configurations.

In one embodiment, testing software 230 can provide one or more tests to ensure that the proper hardware is present on server 130, that the hardware is properly configured, that the BIOS settings are correct, and/or that the proper OS and system software is installed and functioning correctly, among other conditions. A catalog inventory of hardware, BIOS, OS, software, or a combination thereof can be taken. This inventory configuration information, or catalog, can be sent by the servers 130 to the management system 200, for example, as a result of executing reporting commands embedded in the initialization process. In one embodiment, management system 200 can provide queries to OMI 135 to obtain and/or generate the catalog or a portion thereof. In one embodiment, management system 200 can compare the inventory information to system specification requirements to ensure or determine the quality of the server installation. For example, the comparison may reveal inoperable hardware, misconfigured hardware, missing hardware, additional hardware that should not have been included with the server and may lead to performance issues, or a combination thereof. In one embodiment, the comparison can reveal an improper BIOS version and/or incorrect BIOS settings. In another embodiment, the comparison can indicate whether the correct version OS has been installed as the base OS. The comparison can also determine whether any deficiencies occurred with the software installation.

In one embodiment, testing software 230 can also include software, such as in the form of scripts, which can be downloaded and run by servers 130 to ensure or determine that the servers 130 are operating properly. These operational performance tests may include: hardware diagnostic tests, network diagnostic tests, software diagnostic tests, OS diagnostic tests, and/or custom diagnostic tests. Performing these diagnostic tests at each installation can ensure or determine quality delivered in the final configuration of the servers. In addition, testing selection may be determined according to heuristic troubleshooting rules. For example, the testing software deployed may be based on mean time to failure, mean time to recovery and/or trend line analysis, as set forth below.

Mean Time To Failure: Given that servers generally have long running environments, system administrators might like to know what component(s) are statistically most likely to fail at first install (a.k.a., infant mortality), or after a specific condition occurs. Given that knowledge, stress tests can be performed on specific components of the server that are susceptible to infant mortality to discover any impending failure. For example, the mean time to failure for memory sticks in the servers 130 can be estimated to be about 90 days for a bad batch of memory. If a random distribution of this bad memory ended up in servers 130, then the bad memory sticks could be detected by physically examining the serial numbers on the memory sticks themselves, which are installed in the servers 130, which in turn may be vast in number, and physically installed in rack space, possibly at one or more remote locations. Alternatively, the bad memory sticks could be detected by hardware inventory catalog, if the serial numbers of the bad memory sticks are available in the catalog, or by stress testing the memory. Before a system is installed, a hardware inspection test can determine if the memory in a particular server 130 falls into a bad lot and a low level memory test will reveal if the memory passes all the memory tests prior to proceeding to a full install, if the system passes the inspection. If the particular server passes the stress test, then the tested component will likely perform as expected without infant mortality. Management system 200 can include such tests as part of the installation process on the servers 130, and will receive the test results for analysis to confirm that the servers are ready to be placed into operational service. The phrase "placed into operational service" can be understood as: enabling or facilitating, the server, to provide functional or computational services to users or subscribers of a service provider utilizing the server.

Mean Time To Recovery: Some problems are easier to fix than others. Specific components that predictably take longer to replace or repair can be tested to ensure that these critical components will perform properly when placed in service. Continuing the above example concerning a bad lot of memory with a random distribution on the servers 130, suppose that there is a 2-3 week lead time to get replacement memory. Given that the servers 130 would be down waiting for parts for at least 2-3 weeks if the memory components fail, a low level memory stress test can be included to make sure that the memory in the servers 130 is operating properly before proceeding with a full install. Management system 200 can include such tests as part of the installation process on the server, and will receive the test results for analysis to confirm that the server is ready to be placed into operational service.

Trend Line Analysis (Least Squares or linear regression): If components degrade in a linear fashion, tests can be scheduled for those items in a predictable fashion. For example, solid state disks (SSDs) in the servers 130 may degrade with each write that occurs. The degradation may occur in a linear fashion (e.g., each write takes 1 millisecond longer to complete a transaction). Further, if the servers 130 have reused a set of older SSDs that were installed in other systems before being installed in servers 130. Before performing the OS installation, a low level write test can be performed on the server 130 to observe how far the SSDs' performance has degraded. With a large enough set of observations, a trendline could be developed, which indicates that within a certain number of writes, the SSDs would degrade to the point of slowing down a cluster of the servers 130. Management system 200 could predict that, within a given passage of time and an average number of writes per unit time, the server 130 would be unusable. If management system 200 determines that the performance of the SSDs in server 130 falls below a minimum threshold, then the server 130 could be rejected before performing a full install. In addition, management system 200 can set up automatic periodic scheduling of such tests as part of the installation of the server. Management system 200 can set up automatic periodic scheduling of such tests as part of the installation of the servers 130. Management system 200 will then periodically receive test results from the server after installation, while the server has been placed into operational service, to track the performance of potentially degrading components in the server.

Management system 200 can be configured to select a group of tests from testing software 230 according to server configurations stored in server configuration database 220. Further, management system 200 can prioritize the group of tests according to a history of undesired conditions determined for other servers that utilized the configuration. In this fashion, historical experience can be incorporated by the system administrator into the selection of tests. At least some of the group of tests can be selected by management system 200 for performance by a particular server 130 according to the prioritization, and according to a time period in which testing is to be completed. In one embodiment less than all of the tests may be performed based on an order determined from the prioritizing and based on time limitations, network bandwidth limitations, and/or a combination thereof, to make the servers 130 ready to be placed in operational service.

Figure 3:
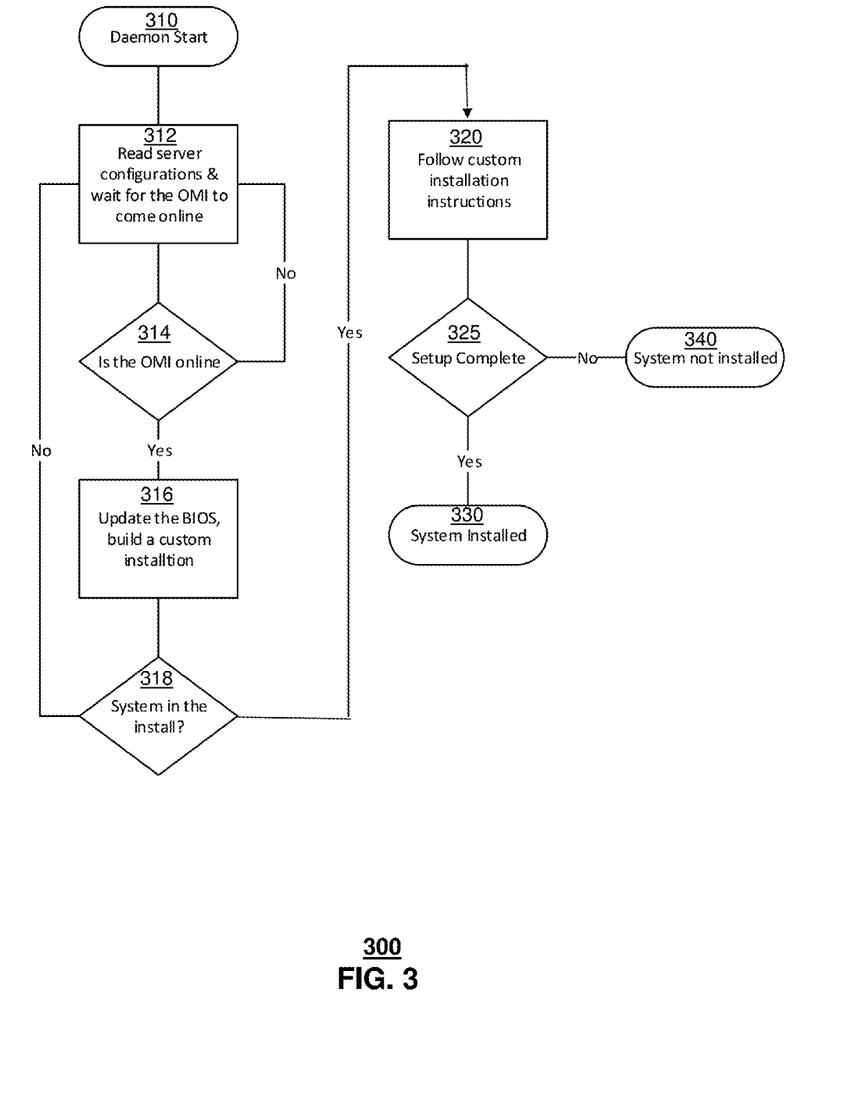
FIG. 3 depicts an illustrative embodiment of a method used in portions of the system described in FIG. 2.

FIG. 3 depicts an illustrative embodiment of a method 300 used in portions of the system described in FIGS. 1 and 2. In particular, the process 300 begins with starting the initializing daemon 210 in management system 200, as shown in step 310. In step 312, initializing daemon 210 can read server configurations from the server configuration database 220 to determine which servers 130 that the management system 200 expects to become available on the IP network 110. The process continues with step 314, where the management system 200 can determine whether the OMI 135 for a particular server 130 is presently available on the IP network 110. If not, then the management system can wait for an OMI 135 of a particular server 130 to come online and the process loops back to step 312. If there is an OMI 135 for a particular server 130 that is online, then the process continues to step 316, where the initializing daemon 210 can establish (or otherwise initiate or facilitate establishing) an HTTPS session with the OMI 135 by sending an authenticating username and password. At this time, the initializing daemon 210 may send HTTPS commands to update the BIOS configuration of the particular server 130 so that it correctly reflects specifications required for the installation.

In one embodiment, initializing daemon 210 can derive the hostname for the particular server 130 from the hostname provided by the OMI 135 associated with the particular server 130. Then initializing daemon can verify the IP address of the particular server 130 by performing a DNS lookup of the derived hostname for the particular server 130 to discover the IP address that should be used for the particular server 130. In another embodiment, IP address(es) may also be specified within configuration database 220 for a particular server or servers 130, if IP network 110 is a management network, without any DNS server 120 or other name service available. In one embodiment, initializing daemon 210 can use the system configuration information stored in database 220 to build a custom installation for the particular server 130, including all system settings, network interface card settings, media partitioning and initialization, localization settings, users and group settings, and so forth, based on the derived hostname of the particular server 130. The initializing daemon 210 can include any pre-installation and/or post-installation tests from testing software 230, and can build and store the custom installation on management system 200 for later download by the particular server 130.

Next, in step 318, the initializing daemon 210 can check database 220 to ensure or determine that the particular server 130 is one of the systems that should be installed. In one embodiment, initializing daemon 210 can then set up a one-time virtual CDROM media (or .iso) on management system 200 from which the particular server 130 can bootstrap the installation process.

The process continues with step 320, where the initializing daemon 210 can send an HTTPS command to OMI 135 of the particular server 130 to bootstrap the particular server 130 into the installation process. The particular server 130 can then mount the one-time virtual CDROM media across IP network 110 and can boot from the filesystem and OS found in the one-time virtual CDROM media to begin the installation process. In one embodiment, initializing daemon 210 can wait for a kickstart file request from the particular server 130 running the installation process, and return a customized kickstart file that particular server 130 uses to perform a customized installation process. When the customized installation process has completed, a fully functional OS can be present on properly formatted and partitioned media of the particular server 130, along with all system settings, network interface card settings, media partitioning and initialization, localization settings, users and group settings, and so forth. Next, providing that the installation process proceeded successfully, the particular server 130 can dismount the one-time virtual CDROM media and reboot itself, using the newly installed OS found on its own media, into a fully functional system. After the particular server 130 reboots, any post-installation testing programs can be executed by the particular server 130, and results can be reported back to management system 200.

The process continues at step 325, where setup has completed on the particular server 130. Initializing daemon 210 can check the status of the particular server 130 to ensure or determine that the installation has successfully completed, and that the results of any testing are satisfactory. If so, the process proceeds to step 330, where the particular server 130 can be deemed ready for operation, and management system 200 may immediately place the particular server 130 into operational service. If the particular server 130 did not meet all of the testing requirements, the process proceeds to step 340, where the particular server 130 is not placed into service. The failure of the particular server 130 to successfully complete the installation process can be analyzed by management system 200, which can invoke remedial measures to rectify the failure condition. Such remedial measure may include repeating the installation process, but with remediation of certain configuration settings for known failures. For example, an IP address conflict can be rectified by resubmitting an A record to DNS/DCHP server 120, and then repeating the installation process using the newly assigned IP address for the particular server 130. As another example, settings for disk groups, memory, users and groups, or any other configuration parameter can be rectified and the installation process repeated. If remedial measures cannot repair the problem, the management system 200 may send a notification to system administrators indicating the failure. Such problems may include, for example, any hardware failures that require manual intervention, or unknown failures for which repeating the installation may not remediate.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
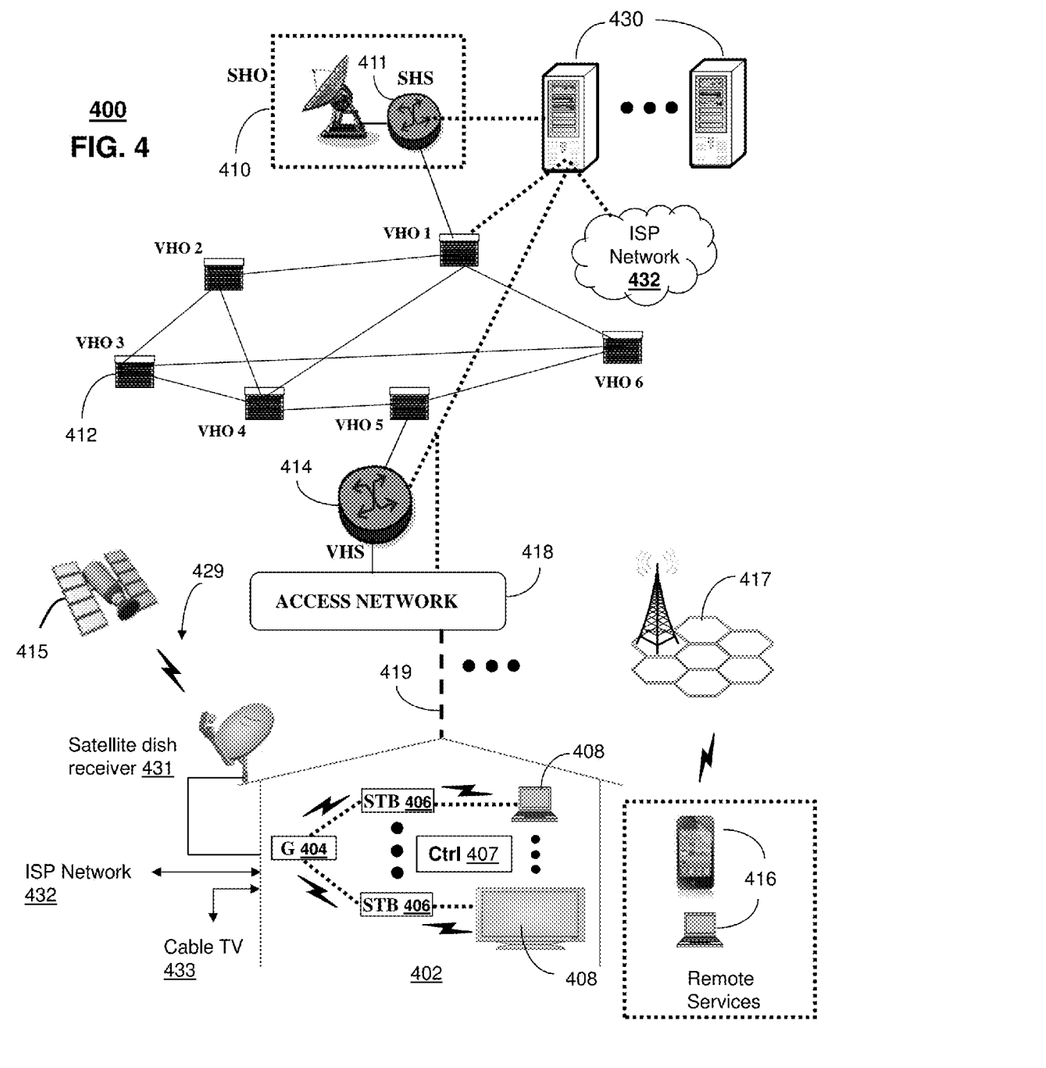
FIG. 4 depicts an illustrative embodiment of a communication system that provide media services using servers.

FIG. 4 depicts an illustrative embodiment of a communication system 400 for delivering media content as an intended server function of servers 130 when the servers 130 are placed into operational service. The communication system 400 can represent or otherwise include an interactive television system, such as an Internet Protocol Television (IPTV) media system. Communication system 400 can operate over a network, such as IP network 110. For instance, one or more servers illustrated in the communication system 400 of FIG. 4 can be configured for operation by the autonomous server installation and management system described above, and then placed into operational service supporting the communication system 400.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
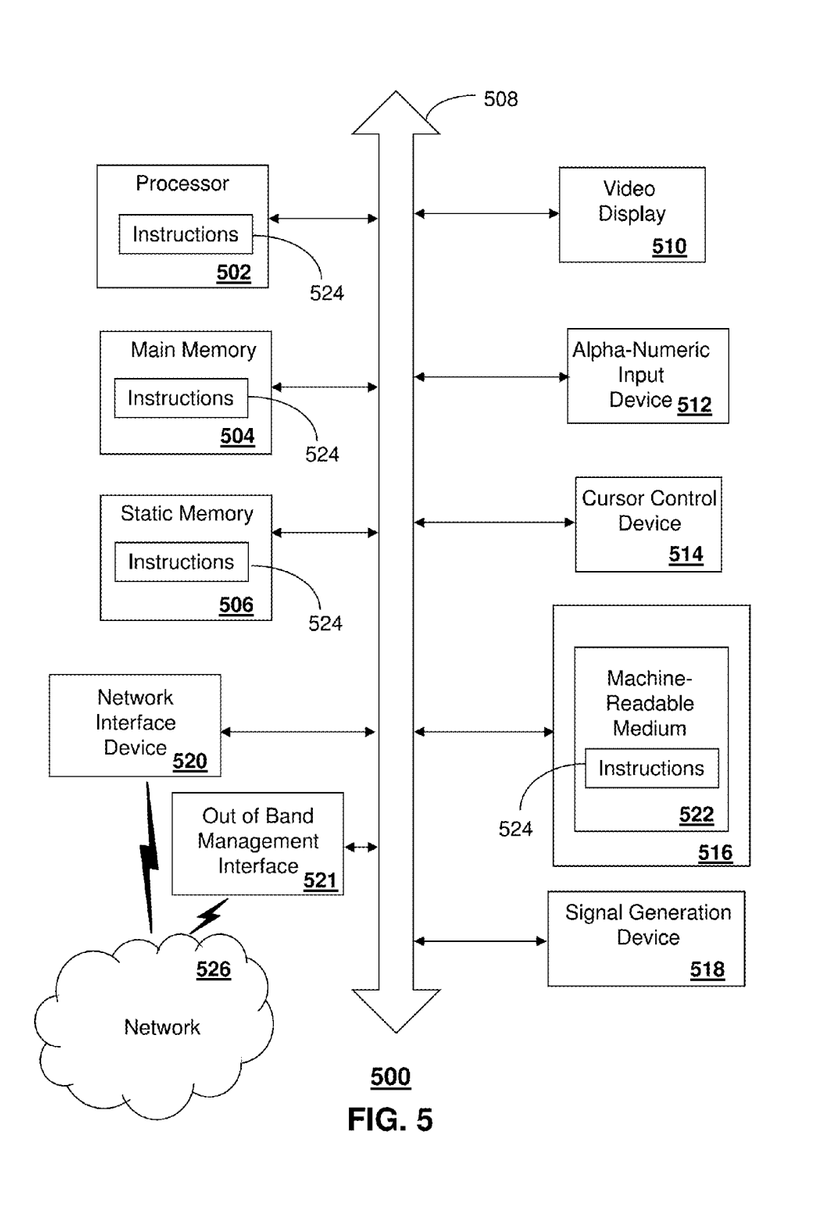
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the DNS/DCHP server 120, the servers 130 requiring installation and configuration, the management system computer 205, the media processor 406 and other devices of FIGS. 1-2 and 4. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control), a network interface device 520, and an out of band network management interface 521. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP and HTTPS) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a processor; and
   a memory that stores executable instructions that, when executed by the processor, facilitate performance of operations, comprising:
   deriving a hostname from an out of band management card in a server on a network;
   determining a virtualization class for the server based on the hostname;
   reading a configuration for the server from a database based on the hostname, the database comprising server configuration information;
   building a custom preinstall image from the configuration, the custom preinstall image comprising a base operating system customized to unique parameters of the virtualization class, wherein the virtualization class comprises one of a controller node, a compute node, or a network node;
   establishing a secure hypertext transport protocol (HTTPS) session over the network with the out of band management card that causes the server to load and execute the custom preinstall image for an installation, wherein the HTTPS session is established without the server being part of any specific network configuration, wherein the HTTPS session is established without any software installed on the server, and wherein the installation is performed without deploying a software agent on the server; and
   receiving an indication from the server that the installation has completed, wherein the installation causes the server to associate with other servers having a same virtualization class in the network.

2. The system of claim 1, wherein the server configuration information comprises a BIOS version, a base operating system, device configuration, kernel configuration, location configuration, users, groups, software packages, or a combination thereof.

3. The system of claim 1, wherein the operations further comprise receiving a catalog of hardware installed in the server, and wherein the processor comprises a plurality of processors operating in a distributed processing environment.

4. The system of claim 3, wherein the operations further comprise: comparing the catalog of the hardware with a hardware inventory; and determining whether the server has malfunctioning hardware, misconfigured hardware, missing hardware, additional hardware, or a combination thereof based on the comparing.

5. The system of claim 1, wherein the operations further comprise sending a HTTPS BIOS detection instruction over the network to the out of band management card and receiving current BIOS configuration of the server.

6. The system of claim 5, wherein the operations further comprise: comparing the current BIOS configuration of the server with the server configuration information; and determining whether the server has a misconfigured BIOS based on the comparing.

7. The system of claim 6, wherein the operations further comprise sending a HTTPS BIOS instruction over the network to the out of band management card to update BIOS settings of the server and sending a HTTPS instruction to reset the server.

8. The system of claim 1, wherein the operations further comprise receiving a catalog of software packages installed in the server.

9. The system of claim 8, wherein the operations further comprise comparing the catalog of the software packages with a software inventory; and determining whether the server has missing software packages, additional software packages, or a combination thereof based on the comparing.

10. The system of claim 1, wherein the operations further comprise sending a HTTPS shutdown instruction over the network to the out of band management card to turn off power to the server; and sending a HTTPS power instruction over the network to the out of band management card to turn on power to the server.

11. A non-transitory machine-readable storage medium, comprising executable instructions that, when executed by a processor, facilitate performance of operations, comprising:

deriving a hostname from an out of band management card in a server on a network;

reading a configuration for the server from a database based on the hostname, the database comprising server configuration information;

determining a virtualization class for the server based on the hostname;

building a custom preinstall image from the configuration, the custom preinstall image comprising a base operating system customized to unique parameters of the virtualization class, wherein the virtualization class comprises one of a controller node, a compute node, or a network node;

establishing a secure hypertext transport protocol (HTTPS) session over the network with the out of band management card that causes the server to load and execute the custom preinstall image for an installation, wherein the HTTPS session is established without the server being part of any specific network configuration, wherein the HTTPS session is established without any software installed on the server, and wherein the installation is performed without deploying a software agent on the server; and receiving an indication from the server that the installation has completed, wherein the installation causes the server to associate with other servers having a same virtualization class in the network.

12. The non-transitory machine-readable storage medium of claim 11, further comprising:

selecting a test for the server based on the configuration;

receiving test results from the server; and analyzing the test results to ensure that the server has passed the test.

13. The non-transitory machine-readable storage medium of claim 12, further comprising placing the server into operational service, responsive to the analyzing.

14. The non-transitory machine-readable storage medium of claim 12, wherein the selecting the test comprises performing a selection according to heuristic troubleshooting rules, and wherein the processor comprises a plurality of processors operating in a distributed processing environment.

15. The non-transitory machine-readable storage medium of claim 14, wherein the test is selected based on mean time to failure for components of the server.

16. The non-transitory machine-readable storage medium of claim 15, wherein test comprises a group of tests that are stress tests for the components of the server.

17. The non-transitory machine-readable storage medium of claim 14, wherein the test is selected based on a linear regression analysis for components of the server.

18. The non-transitory machine-readable storage medium of claim 17, wherein the test is a group of tests that are periodically scheduled performance tests for the components of the server.

19. A method comprising:

deriving a hostname from an out of band management card in a server on a network;

reading a configuration for the server from a database based on the hostname, the database comprising server configuration information;

determining a virtualization class for the server based on the hostname;

building a custom preinstall image from the configuration, the custom preinstall image comprising a base operating system customized to unique parameters of the virtualization class, wherein the virtualization class comprises one of a controller node, a compute node, or a network node;

establishing a secure hypertext transport protocol (HTTPS) session over the network with the out of band management card that causes the server to load and execute the custom preinstall image for an installation, wherein the HTTPS session is established without the server being part of any specific network configuration, wherein the HTTPS session is established without any software installed on the server, and wherein the installation is performed without deploying a software agent on the server; and receiving an indication from the server that the installation has completed, wherein the installation causes the server to associate with other servers having a same virtualization class in the network.

20. The method of claim 19, further comprising comparing a catalog of hardware installed in the server with a hardware inventory; and determining whether the server has malfunctioning hardware, misconfigured hardware, missing hardware, additional hardware, or a combination thereof based on the comparing.

* * * * *